(12) United States Patent
Weber

(10) Patent No.: US 10,193,423 B2
(45) Date of Patent: Jan. 29, 2019

(54) CARBON BRUSH ARRANGEMENT

(71) Applicant: SCHUNK HOFFMANN CARBON TECHNOLOGY AG, Bad Goisern (AT)

(72) Inventor: Markus Weber, Bad Goisern (AT)

(73) Assignee: SCHUNK HOFFMAN CARBON TECHNOLOGY AG, Bad Goisern (AT)

( * ) Notice: Subject to any disclaimer, the term of this patent is extended or adjusted under 35 U.S.C. 154(b) by 71 days.

(21) Appl. No.: 15/117,328

(22) PCT Filed: Dec. 16, 2014

(86) PCT No.: PCT/EP2014/078007
§ 371 (c)(1),
(2) Date: Aug. 8, 2016

(87) PCT Pub. No.: WO2015/120932
PCT Pub. Date: Aug. 20, 2015

(65) Prior Publication Data
US 2016/0352194 A1    Dec. 1, 2016

(30) Foreign Application Priority Data

Feb. 12, 2014    (DE) .................. 10 2014 202 556

(51) Int. Cl.
*H02K 13/10*    (2006.01)
*C08F 114/26*    (2006.01)
(Continued)

(52) U.S. Cl.
CPC ............ *H02K 13/10* (2013.01); *C08F 114/26* (2013.01); *H02K 3/44* (2013.01); *H02K 5/148* (2013.01); *H02K 5/08* (2013.01); *H02K 11/026* (2013.01)

(58) Field of Classification Search
CPC ........ H02K 3/44; H02K 5/148; H02K 11/026; H02K 13/10; H02K 5/08; C08F 114/26
(Continued)

(56) References Cited

U.S. PATENT DOCUMENTS 3,148,295 A * 9/1964 Paxton .................. H01R 39/36
310/249
5,488,261 A * 1/1996 Swoboda ............... H01R 39/58
310/245
(Continued)

FOREIGN PATENT DOCUMENTS

DE    19900024 A1 *  7/2000    ............ H01R 39/20
DE    19921539 A1    11/2000
(Continued)

OTHER PUBLICATIONS

Hanser, Saechtling Kunststoff Taschenbuch, Copyright 2007 Carl Hanser Verlag Munchen, pp. 514-515.
(Continued)

*Primary Examiner* — Alex W Mok
(74) *Attorney, Agent, or Firm* — Quarles & Brady LLP

(57) ABSTRACT

The invention relates to a carbon brush arrangement for connection to an electric motor, comprising at least one carbon brush (17, 18) connected to a connection means (29) provided with a plastic connection housing (32) via a connection conductor (15, 16) provided with a plastic sheath (24, 25), said plastic sheath (24, 25) consisting of perfluoroalkoxy polymer (PFA) in at least a region of transition (33, 34) to the connection housing (32).

5 Claims, 1 Drawing Sheet

(51) Int. Cl.
*H02K 3/44* (2006.01)
*H02K 5/14* (2006.01)
*H02K 5/08* (2006.01)
*H02K 11/026* (2016.01)

(58) Field of Classification Search
USPC .......................................................... 310/249
See application file for complete search history.

(56) References Cited

U.S. PATENT DOCUMENTS

| | | | |
|---|---|---|---|
| 6,413,462 B1 * | 7/2002 | Zoell | B29C 45/14639 264/263 |
| 6,478,613 B1 * | 11/2002 | Zoell | H01R 13/533 417/410.1 |
| 8,102,094 B2 * | 1/2012 | Muehlhausen | H01R 39/36 310/249 |
| 2004/0006103 A1 | 1/2004 | Valducci et al. | |
| 2008/0298985 A1 | 12/2008 | Gettel et al. | |
| 2009/0317264 A1 | 12/2009 | Manke et al. | |
| 2012/0291277 A1 | 11/2012 | Kain et al. | |

FOREIGN PATENT DOCUMENTS

| | | |
|---|---|---|
| DE | 19921540 A1 | 11/2000 |
| EP | 1188166 B1 | 9/2006 |
| EP | 2044661 A1 | 4/2009 |
| FR | 2845736 A1 | 4/2004 |
| GB | 2154375 A | 9/1985 |
| JP | 2010050886 A | 3/2010 |

OTHER PUBLICATIONS

Hanser, Kunststoffchemie fur Ingenieure, Copyright 2007 Carl Hanser Verlag Munchen, pp. 389-393.
Dupont, DuPont Fluoropolymers, Copyright 2011 DuPont, 51 pages.
PCT International Search Report, PCT/EP2014/078007, dated Jun. 25, 2015, 6 pages.
PCT English Language Translation of the International Preliminary Report on Patentability, PCT/EP2014/078007, dated Aug. 25, 2016, 10 pages.
The Patent Office of the People's Republic of China, First Office Action and Search Report, Application No. 201480075217.7, dated Feb. 12, 2018, 8 pages.
Yokogawa Electric Corporation, ADMAG-PFA Liner Durable Under Any Process Condition, Lf01E00A00-12EN, First Edition, Mar. 2012, Copyright 2012 Yokogawa Electric Corporation, 2 pages.

* cited by examiner

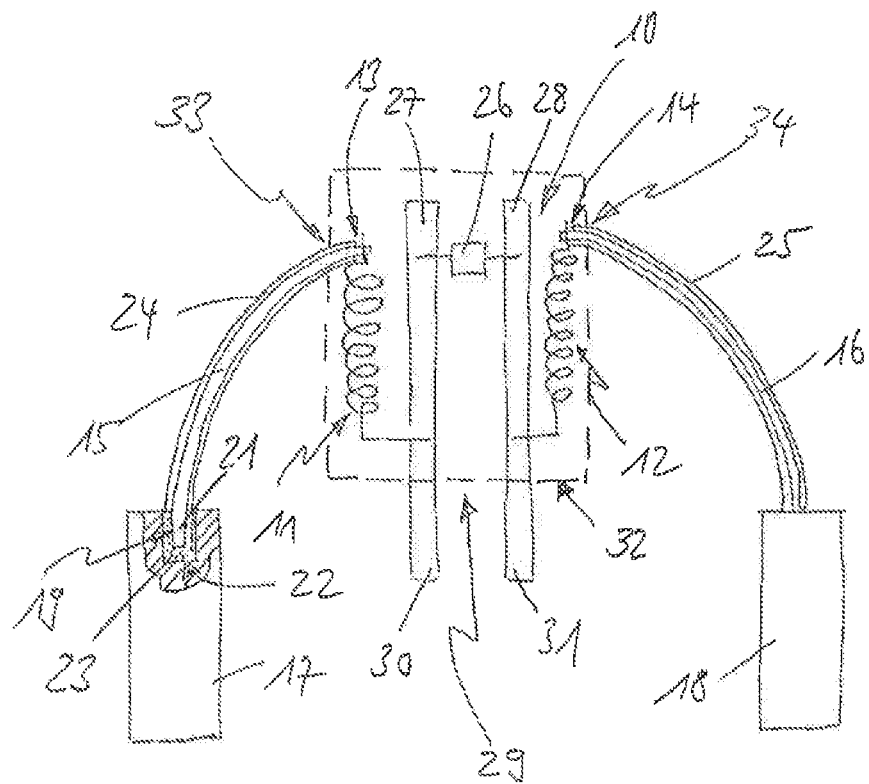

CARBON BRUSH ARRANGEMENT

CROSS-REFERENCE TO RELATED APPLICATIONS

This application represents the national stage entry of PCT International Application No. PCT/EP2014/078007 filed Dec. 16, 2014 and claims priority to German Patent Application No. 10 2014 202 5563 filed Feb. 12, 2014, The contents of this application are hereby incorporated by reference as if set forth in their entirety herein.

The present invention relates to a carbon brush arrangement for connection to an electric motor, comprising at least one carbon brush connected to a connection means provided with a plastic connection housing via a connection conductor provided with a plastic sheath.

Carbon brush arrangements of the kind mentioned above are used to supply electric motors with power in an aggressive environment where the connection conductors have to be shielded particularly well against corrosive influences by means of the plastic sheath. This is the case, for example, in electric motors employed for driving a fuel pump in a fuel tank. In particular the use of polytetrafluoroethylene (PTFE) as a material for producing a plastic sheath for the connection conductors of the carbon brushes has proved advantageous in this context because PTFE exhibits high chemical resistance and in particular a very good resistance to fuel. Although PTFE belongs to the thermoplastics, thermoplastic processing of PTFE, i.e. applying PTFE to the connection conductors so as to form the plastic sheath by injection molding, for example, proves difficult in practice, which is why DE 199 21 540 A1 already proposed using other fuel-resistant plastics, such as POM and PPS, to injection-coat a connection conductor, i.e. to form the plastic sheath by injection molding. To achieve the desired fuel resistance when using POM and PPS, wall thicknesses of the plastic sheath become necessary that lead to high stiffness of the connection conductor. This high stiffness has been recognized to be a disadvantage before in EP 2 044 661 B1 because the stiffness of the connection conductors is contrary to sufficient flexibility required of the connection conductors in practice, said flexibility being necessary for a permanent contact between the wearing carbon brushes and the commutator of the electric motor.

To eliminate this disadvantage, EP 2 044 661 A1 hence proposes forming the plastic sheath of the connection conductor from polytetrafluoroethylene (PTFE), which allows an effectively protective plastic sheath having a smaller wall thickness owing to its higher fuel resistance compared to the known plastics. The small wall thickness of the plastic sheath allows sufficient flexibility of the connection conductors, preventing the permanent contact between the carbon brush and the commutator of the electric motor necessary for smooth operation of the electric motor from being compromised.

To produce the carbon brush arrangements of the kind mentioned above, which have a connection means at the end of the connection conductor, which has a connection housing made of plastic, which serves to receive an electrical arrangement often called suppressor, it has been found that forming the connection housing by injection-coating of the electrical arrangement with a thermoplastic plastic material may lead to defects of the plastic sheath in a region of transition to the plastic sheath of the connection conductor. This is traced back to, among other things, the small wall thickness of the PTFE plastic sheath and to the general lack of suitability of PTFE for processing in an injection-molding process.

Hence, the object of the present invention is to propose a carbon brush arrangement of the kind mentioned above that allows both the plastic sheath and the connection housing to be produced by injection molding on the one hand and ensures the conditions for reliable operation of the carbon brush arrangement with sufficient fuel resistance on the other hand.

According to the invention, the plastic sheath consists of a perfluoroalkoxy polymer (PFA) in at least a region of transition to the connection housing.

Compared to PTFE, PFA has higher flexibility, thus allowing the plastic sheath to be formed with larger wall thickness in an injection-molding process while still maintaining sufficient flexibility of the plastic sheath for achieving the mobility of the connection conductors required for smooth operation. Furthermore, it has been found that to form the connection housing, the PFA plastic sheath can be injection-coated with another thermoplastic plastic material without defects occurring in the region of transition formed in the injection-molding process between the connection housing and the plastic sheath.

Hence, preferably, the connection housing can be formed of a plastic material, in particular a thermoplastic plastic material. PFA, POM and PPS have proved particularly suitable in combination with the plastic sheath of the connection conductor.

In a particularly preferred embodiment of the carbon brush arrangement, not only the precarious region of transition between the plastic sheath and the connection housing is formed of PFA; instead, the plastic sheath consists of PFA across its entire length between the carbon brush and the connection housing, the desired high flexibility of the connection conductor thus being ensured not only in the region of transition but across the entire length of the connection conductor.

Hereafter, a particularly preferred embodiment of the carbon brush arrangement will be explained in more detail with the aid of the drawing.

The drawing shows a conductor frame 10 having two throttles 11, 12 arranged on the conductor frame, contact ends 13, 14 of said throttles 11, 12 being each connected to a connection conductor 15, 16 of carbon brushes 17, 18, the connection conductors 15, 16 being realized as stranded wires, for example. In the case at hand, the connection between the connection conductors 15, 16 and the carbon brushes 17, 18 is realized via tamped contacts 19 in such a manner that a contact end 21 of each connection conductor 15, 16 is arranged in a connection bore 22 of the carbon brush 17, 18 and connected to the carbon brush 17, 18 in an electrically conductive manner via tamping powder 23 compacted in the connection bore 22. A plastic sheath 24, 25 extends on the connection conductors 15, 16 from each tamped contact 19 to the contact end 13, 14 of the throttles 11, 12, the plastic sheath 24, 25 being formed of PFA and applied to the connection conductors 15, 16 by injection molding.

The conductor frame 10 having the throttles 11, 12 arranged thereon and a capacitor 26 that interconnects two connection conductors 27, 28 of the conductor frame 10 together form a connection means 29 that can be connected to a power supply via contact ends 30, 31 formed on the connection conductors 27, 28.

By injection-coating the conductor frame 10 with another plastic material, which may also be formed of PFA or of POM or PPS, a connection housing 32 of the connection means 29 is formed. As illustrated, by forming the connection housing 32, i.e. by injection-coating the conductor frame 10 or the connection means 29, which takes place at a preferred processing temperature of about 240° C. in particular when PFA is used, a region of transition 33, 34 is formed between the plastic sheath 24, 25 of the connection conductors 15, 16 and the connection housing 32.

The good thermoplastic processability in connection with a higher flexibility compared to PTFE and a sufficiently high temperature resistance allow the PEA plastic sheath 24, 25 of the connection conductors 15, 16 to be injection-coated with another plastic material by injection molding without defects being formed in the regions of transition 33, 34 formed by injection coating between the connection housing 32 and the plastic sheath 24, 25.

The invention claimed is:

1. A carbon brush arrangement for connection to an electric motor, comprising:
    at least one carbon brush;
    a first connection conductor, the first connection conductor being provided with a plastic connection housing; and
    a second connection conductor connecting said at least one carbon brush to said first connection conductor, said second connection conductor provided with a plastic sheath consisting of a perfluoroalkoxy polymer (PFA) in at least a region of transition to the connection housing, wherein in order to form the region of transition between the connection housing and the plastic sheath, the plastic sheath consisting of PFA is injection-coated with another thermoplastic material.

2. The carbon brush arrangement according to claim 1, in which the connection housing consists of a plastic material.

3. The carbon brush arrangement according to claim 2, in which the connection housing consists of a thermoplastic plastic material.

4. The carbon brush arrangement according to claim 3, in which the connection housing consists of PFA, POM or PPS.

5. The carbon brush arrangement according to claim 1, in which the plastic sheath consists of PFA across its entire length between the carbon brush and the connection housing.

* * * * *

UNITED STATES PATENT AND TRADEMARK OFFICE
CERTIFICATE OF CORRECTION

PATENT NO. : 10,193,423 B2
APPLICATION NO. : 15/117328
DATED : January 29, 2019
INVENTOR(S) : Markus Weber Page 1 of 1

It is certified that error appears in the above-identified patent and that said Letters Patent is hereby corrected as shown below:

In the Specification

Column 3, Line 11, "PEA" should be --PFA--.

Signed and Sealed this
Twenty-sixth Day of March, 2019

Andrei Iancu
*Director of the United States Patent and Trademark Office*